(No Model.)
W. KURTZ.
METHOD OF AND APPARATUS FOR PRODUCING PHOTOGRAPHIC IMAGES.
No. 267,227. Patented Nov. 7, 1882.
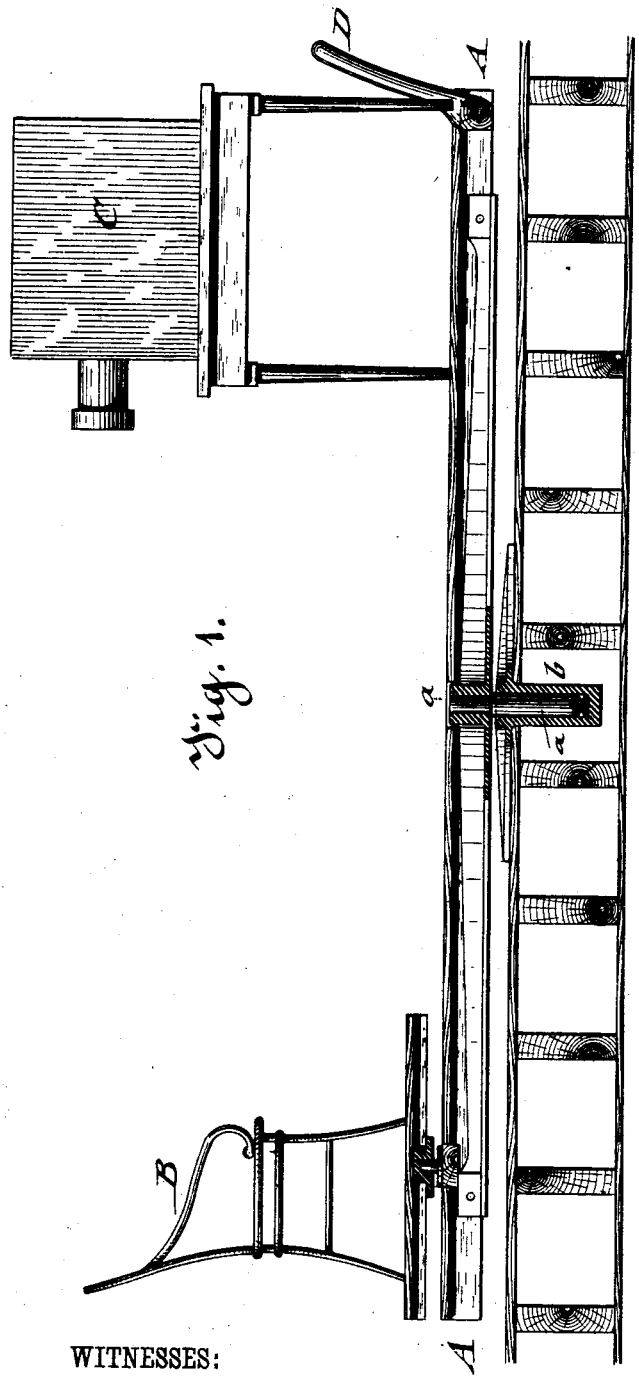
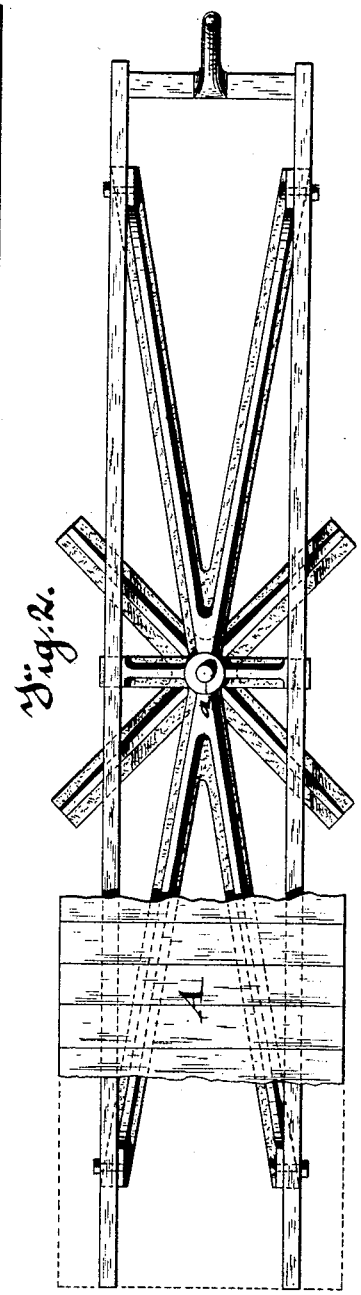
WITNESSES:
INVENTOR
BY
ATTORNEY

UNITED STATES PATENT OFFICE.

WILLIAM KURTZ, OF NEW YORK, N. Y.

METHOD OF AND APPARATUS FOR PRODUCING PHOTOGRAPHIC IMAGES.

SPECIFICATION forming part of Letters Patent No. 267,227, dated November 7, 1882.

Application filed June 6, 1882. (No model.)

*To all whom it may concern:*

Be it known that I, WILLIAM KURTZ, of the city, county, and State of New York, United States of America, have invented certain new and useful Improvements in the Art of Portrait-Photography and Apparatus therefor, of which the following is a specification.

This invention relates to the art of portrait-photography. In portraits taken in the ordinary manner the lighter portions of the negative have to be more or less over-exposed in order to secure a proper deposit in the shaded portions. This necessitates retouching in order to produce a proper negative. It also necessitates a skillful adjustment of screens and reflectors in order to obtain an artistic picture.

The object of this invention is to avoid over-exposed high lights and under-exposed shadows, to dispense in a large degree with the necessity for retouching, and enable a good picture to be produced by inexperienced operators.

The invention consists in moving the camera and sitter, while practically fixed relatively to each other, through arcs of circles in a uniform horizontal plane during exposure, whereby a half-light may be changed to a full light, and vice versa, during exposure, and a more artistic distribution of light and shade obtained.

The invention consists, further, in an improved photographic apparatus, as hereinafter described, in the use of which the camera and sitter may be readily adjusted into the proper position relatively to each other, and the camera and sitter moved during exposure.

In the accompanying drawings, Figure 1 represents a vertical longitudinal section of my improved photographic apparatus, and Fig. 2 is a plan view of the same.

Similar letters of reference indicate corresponding parts.

A in the drawings represents a platform, which is balanced on a center pivot, *a*, in a socket, *b*, of the floor, or arranged with a pivot at the one end, while the other end moves on ways through an arc of a circle. Upon the platform is supported, at one end, a chair or other support, B, for the sitter to be photographed, while at the other end of the platform A is placed the camera C. The chair may have a swiveling seat, whereby the sitter may be readily adjusted into the proper position relative to the camera. At that end of the platform where the camera is supported is arranged a lever, D, by which the platform is moved when required. In place of the lever, pneumatic, hydraulic, or other equivalent appliances may be used, by which the platform is set instantly in motion at the proper time. When everything is ready for exposure the slide of the camera is withdrawn and the platform turned on its pivot for a certain distance, so that the shaded portions of the face are swung into higher lights, thereby shortening the time of exposure, and causing the lights and shades to move over the face during exposure, whereby they become softer, being unable to settle on the face, and impart sharp contours thereto.

The platform A may be of any approved construction, while the remaining appliances are of the usual kind.

By my improved method and apparatus the photographic images are produced by the same appliances as have been used heretofore, either in the wet or dry process, with this difference, that the camera and sitter are placed on a platform which is moved during exposure, so that the lights and shadows are forced to move over the face of the sitter, whereby a more artistic distribution of light and shade and a much better picture are produced. The operator is thereby enabled to expose the object first in a half-light, and turn it then into a strong light, which will give him the "high lights" last, so that he becomes thereby complete master of his light without the trouble and delay of adjusting curtains and blinds. Pictures can also be taken in shorter time with very little retouching, and finish better portraits, which have greater softness and rotundity, and are a more faithful reproduction of nature than pictures with strong high lights and shadows, obtained by the ordinary method heretofore in use.

This process may also be used in photographing statues and other articles in relief, where high lights and shadows occur, and a variation thereof is desirable.

I am aware that in apparatus used in mechanical photography for the photographic reproduction of maps, plans, and other plane surfaces means have been provided for setting up the object true before the lens, and for moving the camera and object into the proper light before exposure. In such cases no benefits would arise from moving the camera and object during exposure, as the light is equally distributed on such plane surfaces. On the contrary, such moving would be detrimental, as in such cases it is of the utmost importance to secure sharpness in all the lines.

I am also aware that an apparatus for photographing children has been devised in which the camera and sitter are placed at opposite ends of a platform supported by cords, and a lateral or longitudinal vibratory motion imparted to the platform during exposure in order to please the child and secure a good expression. In this case there is no disclosure of my improvement. Such a movement would not effect the changes of light and shade such as are obtained by my process, as the face of the child receives the beams of light at substantially the same angle throughout the exposure, whichever way the platform is swung.

Having thus described my invention, I claim as new and desire to secure by Letters Patent—

1. That improvement in the art of portrait-photography which consists in moving the camera and sitter, while practically fixed relatively to each other, through arcs of circles in a uniform horizontal plane during exposure, whereby a half-light may be changed to a full light during exposure, and a more artistic distribution of light and shade obtained, substantially as set forth.

2. A photographic apparatus consisting of a main platform adapted to rotate on a center pivot in a socket of the floor, a rotary platform mounted on one end of the main platform, and a camera at the other end, substantially as described.

In testimony that I claim the foregoing as my invention I have signed my name in presence of two subscribing witnesses.

WILLIAM KURTZ.

Witnesses:
PAUL GOEPEL,
SIDNEY MANN.